March 8, 1949.   F. G. ELY ET AL   2,463,757
APPARATUS FOR THE RECOVERY OF HEAT AND
CHEMICALS FROM FURNACE GASES
Filed Oct. 16, 1942   4 Sheets-Sheet 3
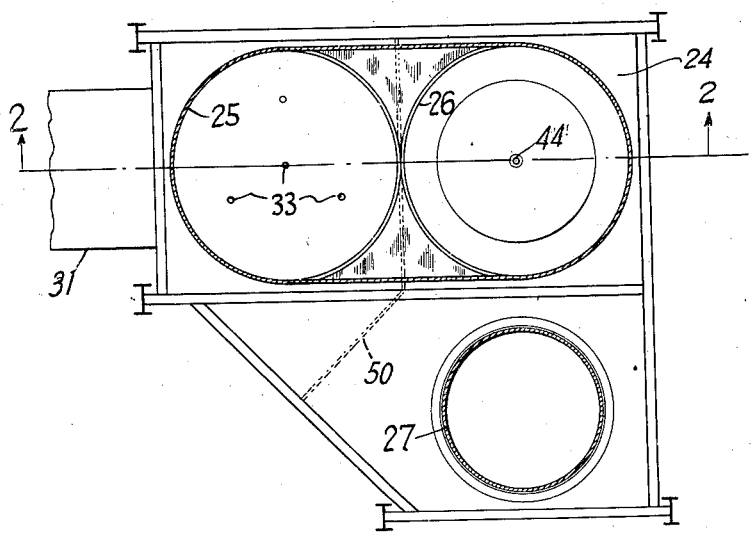
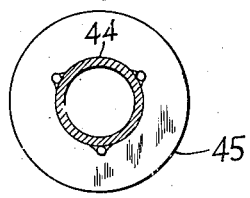
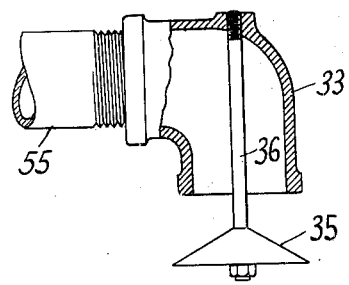
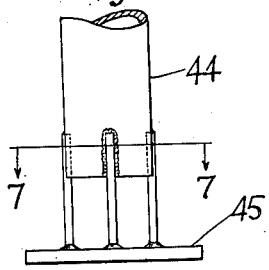
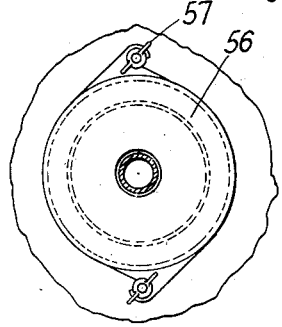
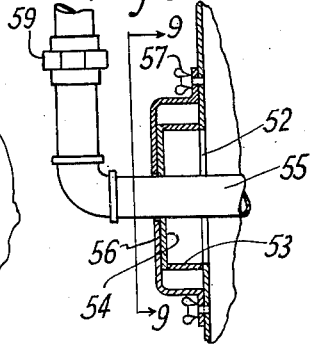
INVENTORS
Frederic G. Ely &
BY Charles E. Rogers
ATTORNEY

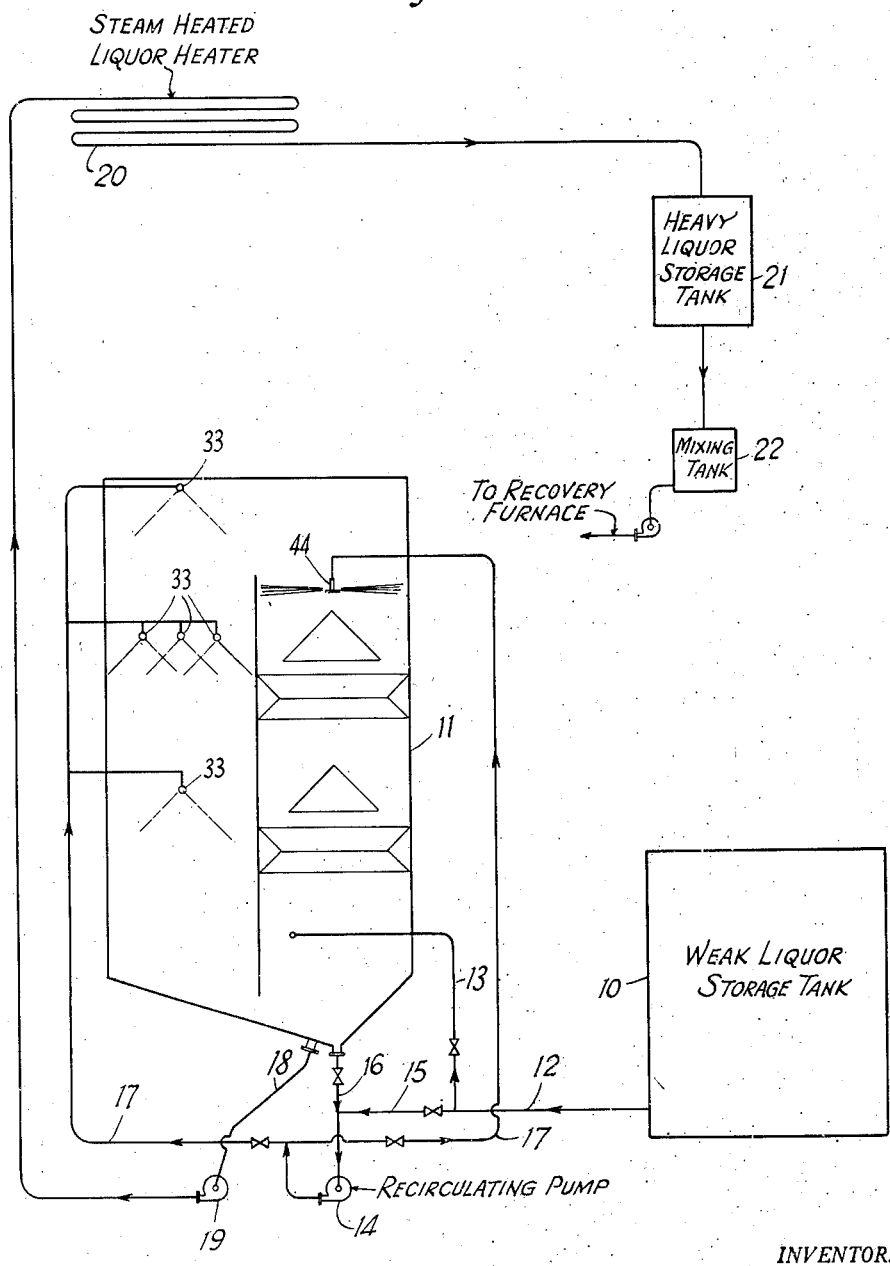

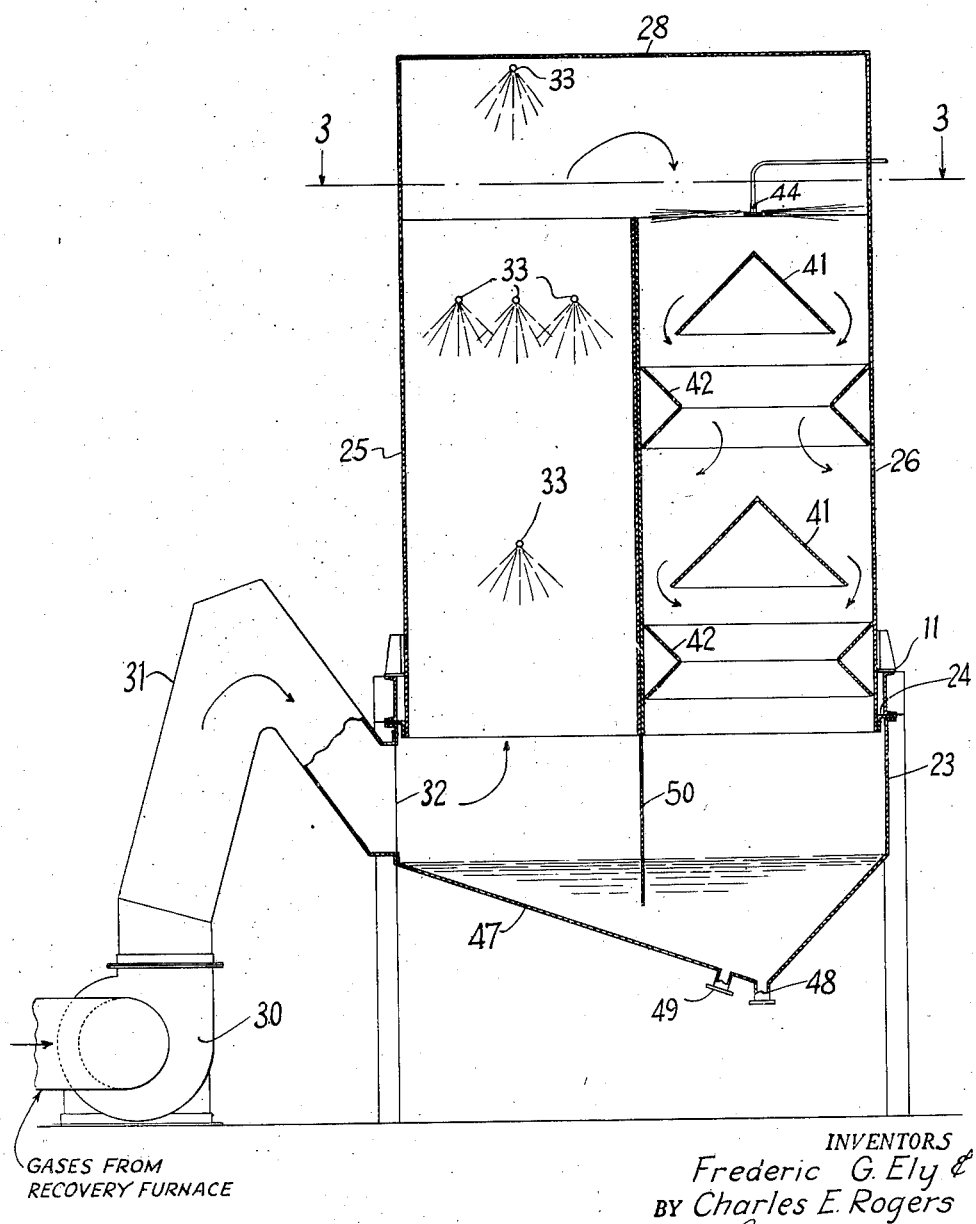

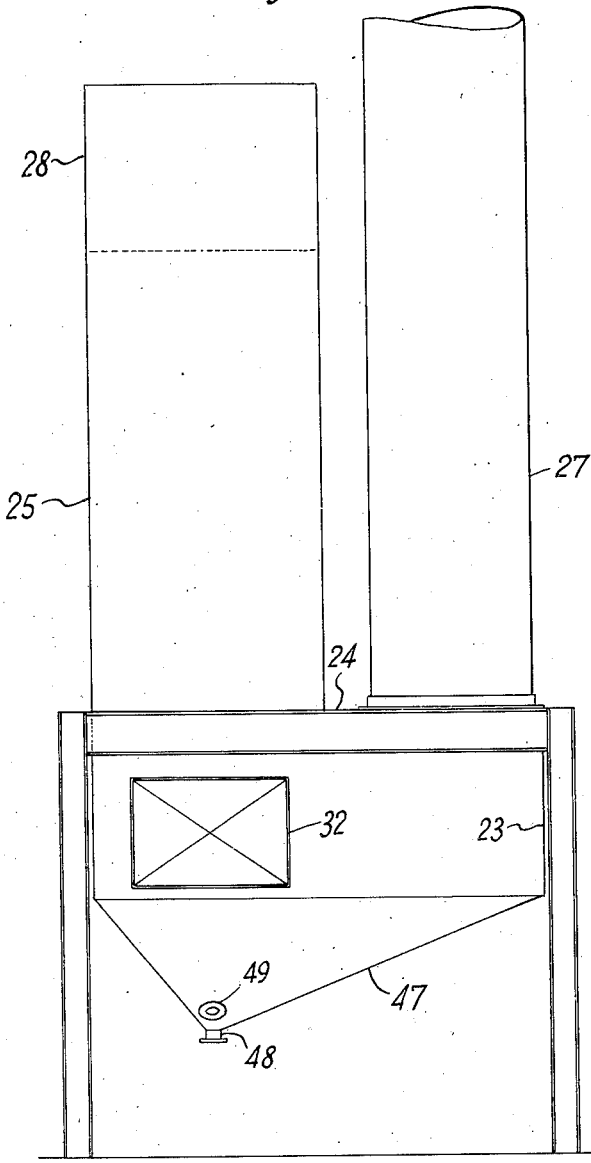

Patented Mar. 8, 1949

2,463,757

UNITED STATES PATENT OFFICE 2,463,757

APPARATUS FOR THE RECOVERY OF HEAT AND CHEMICALS FROM FURNACE GASES

Frederic G. Ely, Short Hills, N. J., and Charles E. Rogers, Kew Gardens, N. Y., assignors to The Babcock & Wilcox Company, Jersey City, N. J., a corporation of New Jersey Application October 16, 1942, Serial No. 462,270

3 Claims. (Cl. 23—48)

The present invention relates in general to the construction and operation of apparatus for recovering heat and/or chemicals from furnace gases, and more particularly to the construction and operation of spray towers used in conjunction with chemical recovery furnaces in the paper pulp industry to form a recovery unit of the general character disclosed in the Tomlinson et al. U. S. Patent No. 2,161,110. In such installations, a spray tower is employed to aid in the concentration of the pulp residual liquor to a density suitable for introduction and incineration in the chemical recovery furnace by means of the heat in the gaseous products of combustion leaving the furnace, while simultaneously removing from the gases certain chemicals capable of reuse in the pulping process.

The general object of our invention is the provision of an improved construction of apparatus of the character described and a method of operating the same which provides a more effective concentration of the liquor being treated and recovery of the chemical solids carried in suspension by the heating gases. A further and more specific object is a spray tower construction providing an upflow of heating gases and a downflow of liquor to be concentrated with an intimate contact between the same in the evaporating section of the spray tower, and a downflow of both heating gases and liquor through a flow path in the chemical recovery or separating section of the tower insuring effective separation of the gases and liquor. A further specific object is a spray tower construction having an extremely low draft loss therethrough, a gas flow therein with a minimum of eddy formation, and a low gas exit velocity. A further specific object is the provision of improved spray nozzle constructions and arrangements especially adapted for use in a spray tower of the cross-sectional shape and gas flow characteristics described. A still further object is the provision of a spray tower construction which is of simple and low cost construction, employs no moving parts, easy to clean and repair, and affords adequate protection to all corrodible parts. A further object is an improved construction and arrangement of the induced draft fan relative to the spray tower of a pulp residual liquor chemical recovery unit.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Fig. 1 is a somewhat diagrammatic view showing the spray tower and associated apparatus;

Fig. 2 is an enlarged sectional elevation of the spray tower shown in Fig. 1, taken on the line 2—2 of Fig. 3;

Fig. 3 is a horizontal section taken on the line 3—3 of Fig. 2;

Fig. 4 is an elevation at the gas entrance end of the spray tower;

Fig. 5 is a detail partly in section of one of the spray nozzles used in the evaporating section;

Fig. 6 is a view similar to Fig. 5 of the spray nozzle used in the separating section;

Fig. 7 is a horizontal section taken on the line 7—7 of Fig. 6;

Fig. 8 shows the piping connection to one of the spray nozzles; and

Fig. 9 is a sectional view taken on the line 9—9 of Fig. 8.

The spray tower construction illustrated is especially designed and particularly adapted for the recovery of heat and chemicals from the waste gases of a chemical recovery furnace for the incineration of concentrated pulp residual liquor. The residual liquor after leaving the digesters and washers ordinarily contains 85%–90% moisture and 10%–15% solids composed of chemicals and combustible organic matter. In the kraft pulping process the chemical content of the residual liquor is mainly sodium carbonate and sodium sulphate. A density of at least 50% solids is usually desired for the liquor when sprayed into the recovery furnace. This concentration is partly effected by a multiple effect evaporator, a portion of the steam generated in the recovery unit being utilized for this purpose. The remaining concentrating effect, such as from 45% to 58% solids, can be wholly or substantially effected by direct contact evaporating apparatus, such as the spray tower arrangement illustrated.

As diagrammatically shown in Fig. 1, in such a concentrating apparatus the partly concentrated liquor from the multiple effect evaporators is delivered to a storage tank 10, from which it is withdrawn as required in the spray tower 11 through the line 12. When starting up initially or any time when a fresh pool of liquid is required in the bottom of the spray tower, the liquid is passed through a valve-controlled line 13, directly into the tower bottom section. Normally, however, the relatively weak liquor is delivered to the inlet side of a recirculating pump 14 through a valve-controlled line 15 connected into a valve-controlled line 16 leading from the tower bottom to the pump inlet. In this way the liquor from the storage tank 10 can be regulably mixed with the normally higher density liquor from the spray tower pool and the mixture delivered to the spray nozzles of the spray tower through pipes 17. Concentrated liquor is withdrawn from the bottom of the spray tower through a pipe 18 and pump 19 and delivered to a supplementary steam heated liquor heater 20. The concentrated liquor is then passed into a heavy liquor storage tank 21 and withdrawn as required to a mixing tank 22, where make-up chemical is added and from which it is pumped to the liquor spray nozzles of the recovery furnace.

The spray tower illustrated consists of a base section 23 having a top plate 24 formed with circular flanged openings for the connection of a pair of cylindrical casings 25 and 26 forming an evaporating chamber and a separating chamber respectively, and a stack connection 27. The casings 25 and 26 are of horizontal circular cross-section substantially throughout their height and at their upper ends open into a common top section 28 forming a cross connection between the chambers. The spray tower receives the solids-laden heating gases from the recovery unit under pressure by means of an induced draft fan 30 which is located between the recovery furnace and spray tower. Operation of the tower under pressure aids in reducing the loss of heat due to air infiltration to a minimum. Heat losses are thus only low radiation losses which can be minimized by insulation of the tower. The heating gases are discharged by the fan 30 through an inverted V-shaped duct 31 and an opening 32 in the wall of the base section 23 slightly above the normal liquor level therein. The gases flow upwardly through the evaporating chamber 25 in intimate contact with descending sprays of liquor from vertically spaced sets of spray nozzles 33. The spray nozzles are shaped as shown in Fig. 5 and arranged to discharge downwardly in a spray pattern of circular contour. A conical splash plate 35 on a rod 36 carried by each nozzle member 33 is spaced below the nozzle discharge opening to produce a hollow conical spray stream. The grouping of the nozzles 33 shown in Figs. 2 and 3 has been found particularly effective. The lowermost nozzle is coaxially arranged at a point less than midway the height of the chamber. Above that point three such nozzles are symmetrically arranged about the axis of the chamber. A fifth nozzle is coaxially positioned at the top of the chamber.

With this arrangement the entering gases and solids in suspension flow upwardly in the chamber 25, i. e. countercurrent to the series of descending liquor sprays. The spray pattern employed insures complete covering of the entire circular cross-section of the chamber. The gas velocity in the chamber 25 is maintained high enough to break up the descending streams of liquor into minute liquor particles. In one installation of this character the entering gas was at a temperature of approximately 600° F. and at a velocity of about 600 ft./min. This gas flow tends to spread the hollow conical sprays and divide the same thereby substantially increasing the surface contact between the liquor and gas stream and increasing the amount of moisture evaporated from the liquor. Most of the unevaporated liquor is also carried out with the stream of gases through the crossover connection 28 into the upper end of the gas and liquid separating chamber 26. The remaining unevaporated liquor drops into the liquor pool in the bottom section 23. Substantially all of the evaporation is effected in the chamber 25, the second chamber 26 being employed primarily to effect the separation of the solids and liquor from the descending gases. The gas temperature in the top section of the installation noted was about 200° F., only slightly higher than the temperature of the stack 27.

In the separating chamber 26 a series of vertically spaced baffles are relatively arranged therein to provide a sinuous high velocity flow path downwardly for the wet gas stream in that section. As shown, the baffle system preferably consists of alternate conical and annular V-shaped baffles 41 and 42 respectively, the conical baffles 41 being arranged coaxially of the chamber, and the baffles 42 extending inwardly from the chamber circumferential wall. This baffle system provides a substantial amount of wetted arresting surface for deposition of solids and liquor and on which the downflow stream successively impinges. An additional liquor spray nozzle 44, preferably of the type shown in Figs. 6 and 7, is positioned coaxially above the uppermost conical baffle 41. This nozzle is designed to produce a flat circular spray due to the symmetrical arrangement of a flat dispersion plate 45 below the discharge end of the nozzle. In this way washing of the gas stream is effected with a minimum number of nozzles, thus minimizing the amount of liquor introduced into this section. The circular shape of the chamber 26 together with the spray and baffle arrangement described insures that all of the metal surfaces will be kept wet by an alkaline liquor. This continuous flow of relatively cool liquor prevents warpage and destruction of the baffles, aids the separation of solids from the gases, prevents the building-up of solid deposits on the baffle and wall surfaces, and prevents corrosion by the sulphur constituents of the gases.

The described baffle construction and arrangement also insures the desired high gas velocities in this chamber by the consequent substantial reduction in the effective gas flow area. In the installation noted the gas flow velocity in the chamber 26 approximated 1200 ft./min. With such velocities and the several changes in direction of flow provided by this baffle arrangement, all portions of the wet gas stream are brought into contact with the wet moisture arresting baffle surfaces and descending liquor film, providing an effective separation of the liquor and solids in solution and suspension from the gases. The liquor film flowing down the lowermost baffle 42 drops into the pool in the bottom of the spray tower, while the gas stream is discharged to the stack connection 27.

The base section 23 of the tower has a tapered bottom 47 formed by flat downwardly sloping sides meeting at an inverted apex, occupied by liquor outlet 48, below the separating chamber 26. The supply line 16 to the recirculating pump 14 is connected to the outlet 48. A second liquor outlet 49 is arranged adjacent the outlet 48 and connected to the pipe 18 leading to the recovery furnace. This bottom construction is preferred as a discharge outlet at this point insures better blending of the liquor in the bottom pool as the liquor portions tend to layer according to the density thereof. It also reduces the tendency of suspended solids to settle out into the corners of the bottom. Solid accumulations in any part of the tower are undesirable as they are likely to clog the recirculating pump supply line on breaking away from the surface to which they were attached. The entire bottom is normally filled with liquor to a predetermined level and the desired level maintained by a suitable level responsive device (not shown) controlling the supply of liquor to the recirculating pump. A partition 50 extends downwardly from the plate 24 to a level below the normal liquid level to provide a liquid seal between the lower ends of the chambers 25 and 26, while permitting the flow of liquor separated in either chamber to the common discharge outlets 48 and 49. The arrangement of the inverted V-shaped flue 31 connecting the fan 30 and spray tower protects the fan from abnormal liquor levels in the tower.

A substantial reduction in gas velocity and further change in direction of the gas stream is effected in the lower part of the separating chamber 26 immediately above the liquor pool by the unobstructed gas flow area in that section and the 180° turn of the gases into the lower part of the stack connection 27. The flow areas in this section are proportioned to insure a gas velocity of not more than 400 ft./min. at the gas exit at the maximum liquor burning capacity of the recovery unit. This low velocity insures that there will be little or no liquor carryover into the stack connection 27, the separated liquor and solids being thrown down into the liquor pool.

In Figs. 8 and 9 we have illustrated a preferred construction of the casing port through which the spray nozzle piping passes and a cover plate for removably positioning the nozzle. The casing port 52 has a circular flange 53 which is sealed by a seal plate 54 fastened to the nozzle branch supply pipe 55. The branch piping is arranged so that the liquor flow to each spray nozzle is always downward in order that the nozzle can completely drain. A cover plate 56 fits around the pipe 55 and is detachably secured to projecting bolts on the casing wall by wing nuts 57 to hold the seal plate 54 against the flange 53. The spray nozzles can thus be easily removed from the casing for cleaning or replacement by breaking a union 59 in the piping and detaching the cover plate 56.

The spray construction and mode of operation described insures a substantial evaporation of the partly concentrated pulp residual liquor and a high recovery of solids from the recovery furnace gases. The initial cost of construction and operating costs are quite low due to the simple construction, low pressure drop and absence of moving parts. Continuity of operation can be successfully maintained even with the high density liquor present due to the absence of solid deposits either in the evaporating and separating chambers or in the collecting pool in the tower bottom.

While in accordance with the provisions of the statutes we have illustrated and described herein the best form of the invention now known to us those skilled in the art will understand that changes may be made in the form of the apparatus disclosed without departing from the spirit of the invention covered by our claims, and that certain features of our invention may sometimes be used to advantage without a corresponding use of other features.

We claim:

1. Apparatus for the recovery of heat and chemicals from pulp residual liquor comprising in combination, a furnace for incinerating concentrated liquor, an induced draft fan arranged to receive solids-laden heating gases from said furnace, a spray tower at the discharge side of said fan and arranged to receive said solids-laden heating gases under a super-atmospheric pressure from said fan, means for concentrating pulp residual liquor and recovering solids from said heating gases in said spray tower, said tower having a bottom constructed to retain a pool of concentrated liquor and a heating gas inlet in the side thereof adjacent the normal level of said pool, an inverted V-shaped conduit connecting said fan and heating gas inlet, and means for delivering the concentrated liquor from the bottom of said spray tower to said furnace.

2. A spray tower having an evaporating chamber and a separating chamber connected at their upper ends, an inlet in the lower portion of said evaporating chamber for heating gases carrying solids in suspension, fan means constructed to discharge said heating gases to said inlet under a superatmospheric pressure, means forming a descending spray of a liquor to be concentrated in intimate contact with the ascending stream of heating gases in said evaporating chamber, said evaporating chamber being substantially unobstructed except by said spray means, a baffle system in said separating chamber arranged to separate liquor and solids from the descending stream of heating gases therein, means for collecting separated liquor in the bottom of said chambers, a heating gas outlet connection to atmosphere connected to the lower part of said separating chamber above the normal liquid level therein, means for withdrawing concentrated liquor and separated solids from the bottom of said spray tower, and means for recirculating a portion of the concentrated liquor withdrawn to said spray means.

3. A spray tower having an evaporating chamber and a separating chamber connected at their upper ends, an inlet in the lower portion of said evaporating chamber for heating gases carrying solids in suspension, fan means constructed to discharge said heating gases to said inlet under a superatmospheric pressure, a bottom common to said chambers having a liquor outlet therein, means forming a descending spray of a liquor to be concentrated in intimate contact with the ascending stream of heating gases in said evaporating chamber, said evaporating chamber being substantially unobstructed except by said spray means, a baffle system in said separating chamber forming a vertically sinuous heating gas flow path and arranged to separate liquor and solids from the descending stream of heating gases therein, means for discharging a stream of the liquor to be concentrated downwardly over said baffle system, a heating gas outlet connection to atmosphere connected to the lower part of said separating chamber above the normal liquid level in said bottom, an unobstructed gas turning space in said separating chamber between the lower end of said baffle system and said gas outlet connection, and means for withdrawing concentrated liquor and separated solids through said liquor outlet.

FREDERIC G. ELY.
CHARLES E. ROGERS.

(References on following page)

REFERENCES CITED

The following references are of record in the file of this patent:

UNITED STATES PATENTS

| Number | Name | Date |
|---|---|---|
| 487,279 | Lane | Dec. 6, 1892 |
| 784,748 | Meehan | Mar. 14, 1905 |
| 1,268,100 | Dreffein | June 4, 1918 |
| 1,501,416 | Lane | July 15, 1924 |
| 1,673,732 | Brooks | June 12, 1928 |
| 1,793,620 | Jacobus | Feb. 24, 1931 |
| 1,933,254 | Goodell | Oct. 31, 1933 |
| 2,056,266 | Goodell | Oct. 6, 1936 |
| 2,161,110 | Tomlinson | June 6, 1939 |
| 2,239,595 | Cummings, Jr. | Apr. 22, 1941 |

FOREIGN PATENTS

| Number | Country | Date |
|---|---|---|
| 269,714 | Great Britain | Apr. 28, 1927 |
| 689,970 | France | June 3, 1930 |